US012269070B2

(12) United States Patent
Prakash et al.

(10) Patent No.: US 12,269,070 B2
(45) Date of Patent: Apr. 8, 2025

(54) FLEXIBLE CAVITATION APPARATUS

(71) Applicant: The Boeing Company, Chicago, IL (US)

(72) Inventors: Om Prakash, Bangalore (IN); Megha Sahu, Bangalore (IN); Sandeep Tripathi, Bangalore (IN); Kamaraj Kandhasamy, Bangalore (IN); Carolyn L. Kupper, Summerville, SC (US)

(73) Assignee: The Boeing Company, Arlington, VA (US)

( * ) Notice: Subject to any disclaimer, the term of this patent is extended or adjusted under 35 U.S.C. 154(b) by 43 days.

(21) Appl. No.: 17/552,956

(22) Filed: Dec. 16, 2021

(65) Prior Publication Data

US 2022/0184670 A1 Jun. 16, 2022

Related U.S. Application Data

(60) Provisional application No. 63/126,470, filed on Dec. 16, 2020.

(51) Int. Cl.

| | |
|---|---|
| ***B08B 3/10*** | (2006.01) |
| ***B08B 3/12*** | (2006.01) |
| ***B08B 9/027*** | (2006.01) |
| ***B08B 13/00*** | (2006.01) |

(52) U.S. Cl.

CPC ................ *B08B 3/102* (2013.01); *B08B 3/12* (2013.01); *B08B 9/027* (2013.01); *B08B 13/00* (2013.01)

(58) Field of Classification Search

CPC ............................................... A47L 15/00–508

See application file for complete search history.

(56) References Cited

U.S. PATENT DOCUMENTS

| | | | | |
|---|---|---|---|---|
| 3,308,839 A | | 3/1967 | Barday | |
| 3,807,632 A | | 4/1974 | Johnson, Jr. | |
| 3,957,531 A | | 5/1976 | Tipping et al. | |
| 4,342,425 A | | 8/1982 | Vickers | |
| 4,474,251 A | | 10/1984 | Johnson, Jr. | |
| 5,316,591 A | | 5/1994 | Chao et al. | |
| 5,501,240 A | * | 3/1996 | Dohku ...................... | B08B 3/02 134/102.2 |

(Continued)

FOREIGN PATENT DOCUMENTS

| | | |
|---|---|---|
| CN | 101670556 A | 3/2010 |
| CN | 102430987 A | 5/2012 |

(Continued)

OTHER PUBLICATIONS

Chahine, Georges L., et al., "Cleaning and Cutting with Self-Resonating Pulsed Water Jets", 2nd US Water Jet Conference, 1983, pp. 195-207.

(Continued)

*Primary Examiner* — Omair Chaudhri

(74) *Attorney, Agent, or Firm* — Walters & Wasylyna LLC

(57) ABSTRACT

An apparatus for removing material from an object surface is disclosed, including a fluid source, a flexible carrier, and a tubular member. The tubular member is connected to the flexible carrier, which is configured to conform to the object surface. The tubular member is configured to carry fluid from the fluid source to the flexible carrier, and has an aperture configured to release fluid and generate cavitation bubbles proximate the object surface.

20 Claims, 5 Drawing Sheets

(56) References Cited

U.S. PATENT DOCUMENTS

| | | | | | |
|---|---|---|---|---|---|
| 5,522,941 | A * | 6/1996 | Uchinami | ............... | B08B 3/102 |
| | | | | | 134/102.1 |
| 5,674,323 | A * | 10/1997 | Garcia | .................. | B08B 9/0325 |
| | | | | | 134/22.12 |
| 5,778,713 | A | 7/1998 | Butler et al. | | |
| 5,820,688 | A * | 10/1998 | Koppl | ..................... | C30B 33/00 |
| | | | | | 257/E21.228 |
| 5,935,659 | A * | 8/1999 | Cane | ..................... | B05C 17/002 |
| | | | | | 401/188 R |
| 6,280,302 | B1 | 8/2001 | Hashish et al. | | |
| 6,341,151 | B1 | 1/2002 | Enomoto et al. | | |
| 6,425,276 | B1 | 7/2002 | Hirano et al. | | |
| 6,513,462 | B1 * | 2/2003 | Shiraishi | ................. | F28G 1/166 |
| | | | | | 122/390 |
| 6,855,208 | B1 | 2/2005 | Soyama | | |
| 6,993,948 | B2 | 2/2006 | Offer | | |
| 7,494,073 | B2 | 2/2009 | Pivovarov | | |
| 7,805,878 | B2 * | 10/2010 | Thomsen | ............... | A01K 85/01 |
| | | | | | 43/4 |
| 8,833,444 | B2 | 9/2014 | McAfee et al. | | |
| 9,050,642 | B2 | 6/2015 | Alberts et al. | | |
| 9,200,341 | B1 | 12/2015 | Sanders et al. | | |
| 9,433,986 | B2 | 9/2016 | Ogawa et al. | | |
| 9,573,246 | B2 | 2/2017 | Maeguchi et al. | | |
| 9,739,695 | B2 | 8/2017 | Michishita et al. | | |
| 10,233,511 | B1 | 3/2019 | Sanders et al. | | |
| 10,265,833 | B2 | 4/2019 | Sanders et al. | | |
| 10,836,012 | B2 | 11/2020 | Sanders | | |
| 2002/0098776 | A1 | 7/2002 | Dopper | | |
| 2003/0062071 | A1 * | 4/2003 | Sorbo | ..................... | A61L 2/025 |
| | | | | | 134/109 |
| 2004/0187891 | A1 * | 9/2004 | Chou | ........................ | B08B 3/12 |
| | | | | | 134/1 |
| 2005/0017090 | A1 | 1/2005 | Pivovarov | | |
| 2005/0139697 | A1 | 1/2005 | Pivovarov | | |
| 2005/0080396 | A1 * | 4/2005 | Rontal | ............. | A61B 17/22004 |
| | | | | | 604/500 |
| 2005/0241668 | A1 * | 11/2005 | Trampuz | ................... | B08B 3/12 |
| | | | | | 134/1 |
| 2006/0151634 | A1 | 7/2006 | Pivovarov | | |
| 2006/0191424 | A1 * | 8/2006 | McLoughlin | ............. | B06B 3/00 |
| | | | | | 99/451 |
| 2006/0191562 | A1 * | 8/2006 | Nunomura | ................ | B08B 3/02 |
| | | | | | 134/198 |
| 2010/0224222 | A1 * | 9/2010 | Vedovelli | .................. | B08B 3/04 |
| | | | | | 134/198 |
| 2010/0255759 | A1 * | 10/2010 | Ohashi | .................... | B24C 3/325 |
| | | | | | 451/38 |
| 2011/0155169 | A1 * | 6/2011 | Holsteyns | ......... | H01L 21/67051 |
| | | | | | 134/1 |
| 2012/0027644 | A1 * | 2/2012 | Eum | ................... | A47J 43/0705 |
| | | | | | 422/128 |
| 2012/0073596 | A1 * | 3/2012 | Holsteyns | ......... | H01L 21/67057 |
| | | | | | 134/1 |
| 2012/0118562 | A1 | 5/2012 | McAfee et al. | | |
| 2012/0217235 | A1 * | 8/2012 | Mathai | ................... | H05B 6/101 |
| | | | | | 219/600 |
| 2012/0227761 | A1 * | 9/2012 | Leighton | ................... | B08B 3/10 |
| | | | | | 134/1 |
| 2013/0284440 | A1 | 10/2013 | McAfee et al. | | |
| 2016/0067004 | A1 * | 3/2016 | Geddis | .................... | B08B 3/102 |
| | | | | | 134/169 C |
| 2016/0271652 | A1 * | 9/2016 | Fukumoto | ........... | B01F 23/2323 |
| 2017/0292214 | A1 * | 10/2017 | Scharf | ..................... | D06F 19/00 |
| 2019/0061103 | A1 | 2/2019 | Sanders | | |
| 2019/0061104 | A1 | 2/2019 | Sanders et al. | | |
| 2019/0308292 | A1 | 10/2019 | Nagalingam et al. | | |
| 2019/0314866 | A1 * | 10/2019 | Boldyrev | .................. | B08B 5/02 |
| 2020/0009620 | A1 * | 1/2020 | Tibbetts | ............... | C11D 3/2086 |
| 2020/0164411 | A1 * | 5/2020 | Chien | ..................... | B08B 3/024 |
| 2020/0254586 | A1 * | 8/2020 | Sanders | .................. | B24C 3/325 |
| 2021/0060651 | A1 * | 3/2021 | Go | ............................ | B08B 3/12 |
| 2022/0055721 | A1 * | 2/2022 | McMurray | ............ | D06M 16/00 |
| 2022/0211244 | A1 * | 7/2022 | An | ...................... | A47L 15/4223 |

FOREIGN PATENT DOCUMENTS

| | | | | | |
|---|---|---|---|---|---|
| CN | 102649994 | A | 8/2012 | | |
| CN | 104440584 | A | 3/2015 | | |
| CN | 205438241 | U | 8/2016 | | |
| CN | 106392863 | A | 2/2017 | | |
| CN | 110064624 | A * | 7/2019 | | |
| DE | 102005025583 | A1 * | 1/2006 | ............... | B05B 1/00 |
| DE | 60031257 | T2 | 2/2007 | | |
| DE | 102006037069 | A1 | 2/2007 | | |
| DE | 60030341 | T2 | 8/2007 | | |
| EP | 0450222 | A2 | 10/1991 | | |
| EP | 1500712 | B1 | 8/2006 | | |
| EP | 1170387 | B1 | 10/2006 | | |
| EP | 2546026 | A1 | 1/2013 | | |
| EP | 2736678 | B1 | 9/2015 | | |
| GB | 2326609 | A * | 12/1998 | ............... | B05B 1/04 |
| IN | 103415358 | A | 11/2013 | | |
| JP | H04362124 | A | 12/1992 | | |
| JP | H0647667 | A | 2/1994 | | |
| JP | H07328855 | A | 12/1995 | | |
| JP | H07328857 | A | 12/1995 | | |
| JP | H07328859 | A | 12/1995 | | |
| JP | H07328860 | A | 12/1995 | | |
| JP | H0871919 | A | 3/1996 | | |
| JP | H0890418 | A | 4/1996 | | |
| JP | 2003062492 | A | 3/2003 | | |
| JP | 2007075958 | A | 3/2007 | | |
| JP | 4240972 | B2 | 3/2009 | | |
| JP | 2009090443 | A | 4/2009 | | |
| JP | 2011-245582 | A | 12/2011 | | |
| JP | 2012230253 | A | 11/2012 | | |
| JP | 2013082030 | A | 5/2013 | | |
| JP | 5578318 | A | 8/2014 | | |
| JP | 5876701 | B2 | 3/2016 | | |
| JP | 2016221650 | A | 12/2016 | | |
| KR | 100390661 | B1 * | 7/2003 | ............. | A45D 29/17 |
| WO | WO-9528235 | A1 * | 10/1995 | ............. | B08B 3/102 |
| WO | WO-2005030406 | A1 * | 4/2005 | ............. | A45D 29/17 |
| WO | 2013019317 | A1 | 2/2013 | | |
| WO | WO-2015050306 | A1 * | 4/2015 | ............. | B05B 1/202 |
| WO | WO-2015144918 | A1 * | 10/2015 | .............. | B01J 19/10 |
| WO | 2016131483 | A1 | 8/2016 | | |

OTHER PUBLICATIONS

Vijay, M., et al., "A study of the practicality of cavitating water jets", Jet Cutting Technology, 1992, vol. 13, pp. 75-99.

Soyama, et al., Use of Cavitating Jet for Introducing Compressive Residual Stress, Article in Journal of Manufacturing Science and Engineering, vol. 22, Feb. 2000, 7 pages.

Macian, V., et al., "A CFD analysis of the influence of diesel nozzle geometry on the inception of cavitation", Atomization and Sprays, 2003, vol. 13, pp. 579-604.

Payri, Raul, et al. "A study of the relation between nozzle geometry, internal flow and sprays characteristics in diesel fuel injection systems", KSME International Journal, 2004, vol. 18, No. 7, pp. 1222-1235.

Desantes, J., et al., "Experimental characterization of outlet flow for different diesel nozzle geometries", 2005, No. 2005-01-2120, SAE Technical Paper, 10 pages.

Turski, et al., Engineering the residual stress state and microstructure of stainless steel with mechanical surface treatments, Article for Springer-Verlag, May 11, 2010, 8 pages.

Hattori, Shuji, et al., "Prediction method for cavitation erosion based on measurement of bubble collapse impact loads." Wear 269.7-8 (2010), published online Jun. 25, 2010: pp. 507-514.

Takakuwa, Osamu, et al., "Suppression of hydrogen-assisted fatigue crack growth in austenitic stainless steel by cavitation peening." International journal of hydrogen energy 37.6 (2012), published online Jan. 2, 2012: pp. 5268-5276.

(56) References Cited

OTHER PUBLICATIONS

Soyama, Hitoshi, “Effect of nozzle geometry on a standard cavitation erosion test using a cavitating jet.” Wear 297.1-2 (2013), published online Nov. 15, 2012: pp. 895-902.
Patella, Regiane Fortes, et al., “Mass loss simulation in cavitation erosion: Fatigue criterion approach.” Wear 300.1-2 (2013), published online Feb. 13, 2013: pp. 205-215.
Mitelea, Ion, et al. “Ultrasonic cavitation erosion of nodular cast iron with ferrite-pearlite microstructure.” Ultrasonics Sonochemistry 23 (2015), published online Nov. 10, 2014: pp. 385-390.
Li, Deng, et al., “Effects of nozzle inner surface roughness on the cavitation erosion characteristics of high speed submerged jets.” Experimental Thermal and Fluid Science 74 (2016), published online Jan. 28, 2016: pp. 444-452.
Sato, et al., Using Cavitation Peening to Improve the Fatigue Life of Titanium Alloy Ti-6A1-4V Manufactured by Electron Beam Melting, Article for Scientific Research Publishing, Apr. 20, 2016, 11 pages.
Deng, Li et al., “ Experimental study on the effect of feeding pipe diameter on the cavitation erosion performance of self-resonating cavitating waterjet”, Experimental Thermal and Fluid Science, Elsevier, Amsterdam, NL, vol. 82, Nov. 27, 2016, pp. 314-325.
Marcon, Andrea, Water Cavitation Peening for Aerospace Materials—A Dissertation Presented to the Academic Faculty at The Georgia Institute of Technology, Jan. 2017, 211 pages.
Tan, K.L., et al. Surface Modification of Additive Manufactured Components by Ultrasonic Cavitation Abrasive Finishing, Wear, 378-379, 2017, 90-95 pg, Singapore.
U.S. Patent and Trademark Office, Office action regarding U.S. Appl. No. 15/693,409, dated May 30, 2018, 11 pages.
U.S. Patent and Trademark Office, Office action regarding U.S. Appl. No. 15/693,417, dated May 30, 2018, 10 pages.
European Patent Office, Extended European Search Report in European Patent Application No. 18190086.1, dated Feb. 5, 2019, 7 pages.
European Patent Office, Extended European Search Report in European Patent Application No. 18189818.0, dated Feb. 6, 2019, 10 pages.
European Patent Office, Extended European Search Report in European Patent Application No. 18190518.3, dated Feb. 6, 2019, 12 pages.
European Patent Office, Examination Report regarding European Patent Application No. 18190086.1, dated Jul. 30, 2019, 4 pages.
European Patent Office, Examination Report regarding European Patent Application No. 18189818.0, dated Oct. 24, 2019, 4 pages.
Tan, K. L., et al., “Surface finishing on IN625 additively manufactured surfaces by combined ultrasonic cavitation and abrasion.” Additive Manufacturing 31 (2020) 100938, published online Nov. 6, 2019, 22 pages.
U.S. Patent and Trademark Office, Non-Final Office Action regarding U.S. Appl. No. 15/693,401, dated Nov. 15, 2019, 20 pages.
Ma, Wei, et al., “Experimental Research on the Waterjet Oscillating Characteristics of Helmholtz Nozzle”, Journal of Applied Science and Engineering, 2019, vol. 22, No. 1, pp. 83-92.
European Patent Office, Communication Pursuant to Article 94(3) EPC regarding European Patent Application No. 18190086.1, dated May 7, 2020, 4 pages.
Campo, Frank, et al. “SERDP & ESTCP Webinar Series: Reducing Hazardous Materials in Weapons Systems: Advances in Waterjet Applications and Cold Spray Technologies” video, retrieved from the internet on Jan. 6, 2021, from www.serdp-estcp.org/Tools-and-Training/Webinar-Series/09-10-2020, published Sep. 10, 2020, 2 bages.
European Patent Office, Examination Report regarding European Patent Application No. 18189818.0 dated Jan. 12, 2021, 5 pages.
The State Intellectual Property Office of P.R.C., First Office Action and Search Report regarding Chinese Patent Application No. 2018109918271, dated Mar. 30, 2021, 18 pages.
The State Intellectual Property Office of P.R.C., First Office Action and Search Report regarding Chinese Patent Application No. 2018109917851, dated Jun. 2, 2021, 17 pages.
European Patent Office, Examination Report regarding European Patent Application No. 18190518.3, dated Jun. 21, 2021, 6 pages.
European Patent Office, Extended European Search Report in European Patent Application No. 21178917.7, dated Nov. 8, 2021, 10 pages.
Supponen, Outi, et al., “Detailed Jet Dynamics in a Collapsing Bubble.” Journal of Physics: Conference Series. vol. 656. No. 1. IOP Publishing, 2015, 5 pages.
“Cavitation.” Wikipedia, Wikimedia Foundation, Apr. 6, 2020, URL: https://en.wikipedia.org/wiki/cavitation, 17 pages.

* cited by examiner

FLEXIBLE CAVITATION APPARATUS

CROSS-REFERENCES

This application claims the benefit under 35 U.S.C. § 119(e) of the priority of U.S. Provisional Patent Application Ser. No. 63/126,470, filed Dec. 16, 2020, the entirety of which is hereby incorporated by reference for all purposes.

BACKGROUND

Mechanical cleaning offers an attractive alternative to chemical cleaning agents, which can be expensive, hazardous, or difficult to dispose of. For example, ultrasonic cleaning has been used to degrease parts submerged in a liquid filled tank. However, considerable energy is lost between the ultrasonic actuator and target surfaces. Complex surface geometries and parts with interior surfaces can reduce the efficacy and/or efficiency of more direct mechanical cleaning methods. A method and apparatus for effective mechanical degreasing of a variety of part geometries is desirable.

SUMMARY

The present disclosure provides systems, apparatus, and methods relating to cavitation cleaning. In some examples, an apparatus for removing material from an object surface may include a fluid source, a flexible carrier, and a tubular member. The tubular member may be connected to the flexible carrier, which may be configured to conform to the object surface. The tubular member may be configured to carry fluid from the fluid source to the flexible carrier, and may have an aperture configured to release fluid and generate cavitation bubbles proximate the object surface.

In some examples, a method of removing adhered material from an object surface may include positioning a flexible carrier at the object surface. The flexible carrier may support one or more tubular members, each tubular member having one or more apertures configured to deliver fluid including cavitation bubbles to the object surface. The method may further include pumping fluid through the one or more tubular members and the one or more apertures, to generate cavitation bubbles proximate the object surface.

In some examples, an apparatus for removing adhered material from an object surface may include a fluid source, a flexible carrier, and a tubular member. The flexible carrier may be configured to wrap at least partially around the object surface. The tubular member may be configured to carry fluid from the fluid source to the flexible carrier, and may have a plurality of apertures configured to generate a bubble cloud proximate the surface of the object.

Features, functions, and advantages may be achieved independently in various examples of the present disclosure, or may be combined in yet other examples, further details of which can be seen with reference to the following description and drawings.

DETAILED DESCRIPTION

Various aspects and examples of a flexible apparatus for controlled cavitation, as well as related systems and methods, are described below and illustrated in the associated drawings. Unless otherwise specified, a flexible cavitation apparatus in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, a flexible cavitation apparatus in accordance with the present teachings may include a source of fluid, a flexible carrier, and at least one tube with apertures configured to release bubbles. The tube may be secured to the flexible carrier and in fluid communication with the source of fluid. Pressure fluctuations in the fluid and/or in a fluid environment surrounding the released bubbles may be used to induce cavitation of the bubbles.

A user of the apparatus may wrap the flexible carrier around a part having a surface to be cleaned, conform the flexible carrier to the surface to be cleaned, insert the flexible carrier into an interior of the part, and/or otherwise position the flexible carrier such that bubbles released by the apertures of the at least one tube collapse at or near the surface.

Figure 1:
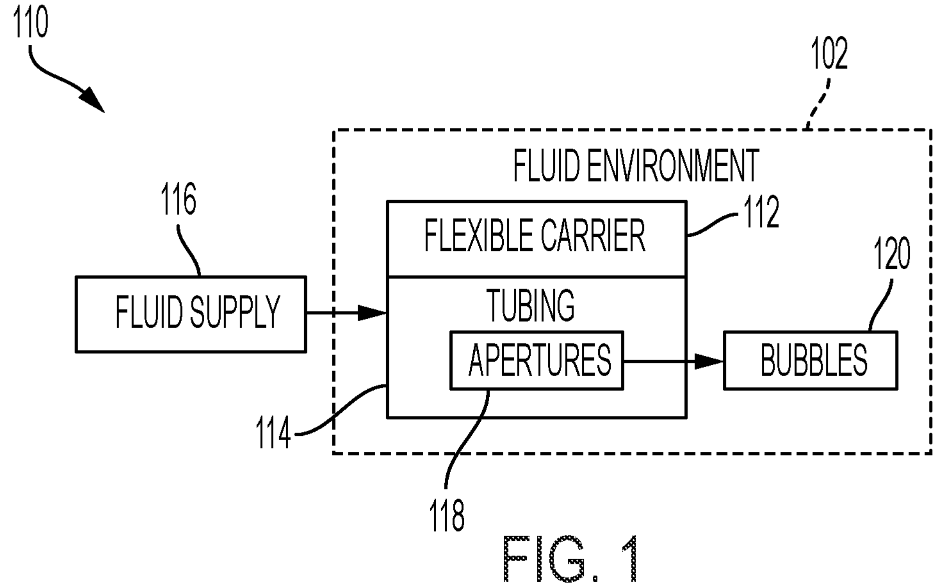
FIG. 1 is a schematic diagram of an illustrative flexible cavitation apparatus in accordance with aspects of the present disclosure.

FIG. 1 is a schematic diagram of an illustrative flexible cavitation apparatus 110. The apparatus includes a flexible carrier 112 and tubing 114. The flexible carrier may comprise any material appropriate to conform to or accommodate a workpiece, and have any shape or configuration suitable to a workpiece or range of workpieces. Examples of a flexible carrier are shown in FIGS. 2-5, and described below. Tubing 114 may be connected or fixed to flexible carrier 112 in any effective manner, including but not limited to bonding, sewing, weaving, and/or manufacture as a single unitary structure.

Cavitation apparatus 110 is configured to transport fluid from a supply 116, through tubing 114, and out of apertures 118 to form bubbles 120. Tubing 114 may be made up of one or more tubes, each in fluid communication with fluid supply 116. The tubes may be arranged according to a structure of flexible carrier 112 and/or according to a desired flow pattern. For example, tubes or tubing 114 may be arranged in series or in parallel to achieve a desired pressure drop between fluid supply 116 and apertures 118. For another example, tubes or tubing 114 may be arranged in an array of parallel tubes to facilitate weaving into a fabric material of flexible carrier 112.

Apertures 118 may be regularly spaced along tubing 114 and/or arranged according to a selected pattern. The apertures may be spaced according to a desired cleaning intensity. For example, apertures 118 may be clustered in regions of flexible cavitation apparatus 110 corresponding to areas of a workpiece requiring additional or intensive cleaning. Apertures 118 may be circular and extend perpendicularly through a wall of tubing 114, and/or the apertures may be shaped, angled, and/or otherwise configured to achieve desired bubble production. In some examples, tubing 114 may include inserts positioned in and/or defining the apertures.

The fluid transported through cavitation apparatus 110 may depend on a fluid environment 102 surrounding flexible carrier 112 and tubing 114. That is, the transported fluid and/or fluid environment may be selected to allow formation of bubbles 120. For example, if fluid environment 102 is a liquid environment such as water or an aqueous solution of a cleaning agent, then the transported fluid may be a gas such as air or solvent vapour. In another example, if fluid environment 102 is a gaseous environment such as ambient air or solvent vapour, then the transported fluid may be a combination of a liquid and a gas such as water and solvent vapour.

In some examples, cavitation apparatus 110 may be used for purely mechanical cleaning of a part, and fluids such as water and air may be used to generate cavitation. In some examples, mechanical cleaning by cavitation may be augmented with cleaning agents such as solvents or detergents. Cleaning agents may be incorporated into fluid environment 102 and/or the transported fluid. Cavitation apparatus 110 may be used to remove materials adhered and/or adsorbed to a surface of a part, including but not limited to grease, adhesive residue, combustion by-products, and compromised protective coatings.

Fluid supply 116 may include a reservoir of the fluid to be transported and a source of pressure to actuate the transportation. For example, the fluid supply may include a tank and a compressor or pump. Fluid supply 116 may have the capability to vary the pressure of the transported fluid. For example, a compressor may be configured to cycle on and off, or oscillate between two selected pressures. In some examples, the cavitation apparatus may further comprise a mechanism to induce pressure variations or oscillations in fluid environment 102.

Cavitation apparatus 110 may be used as part of a cleaning system. In some examples, fluid supply 116, fluid environment 102, and/or any pressure control mechanism may be described as part of the cleaning system while flexible cavitation apparatus 110 is described as comprising flexible carrier 112 and tubing 114. A cleaning system may also include additional equipment such as a heater, a tank, and/or a recycling or reclamation system.

Figure 2:
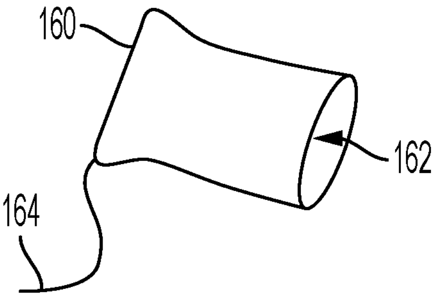
FIG. 2 is a schematic side view of an illustrative cavitation bag.
Figure 3:
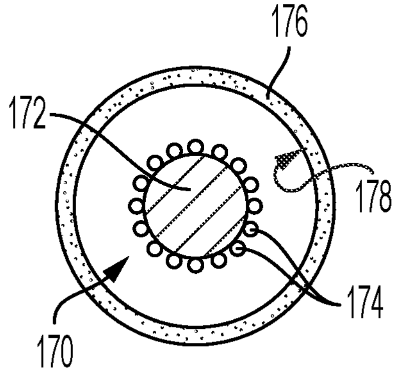
FIG. 3 is a schematic cross section of an illustrative cavitation insert.
Figure 4:
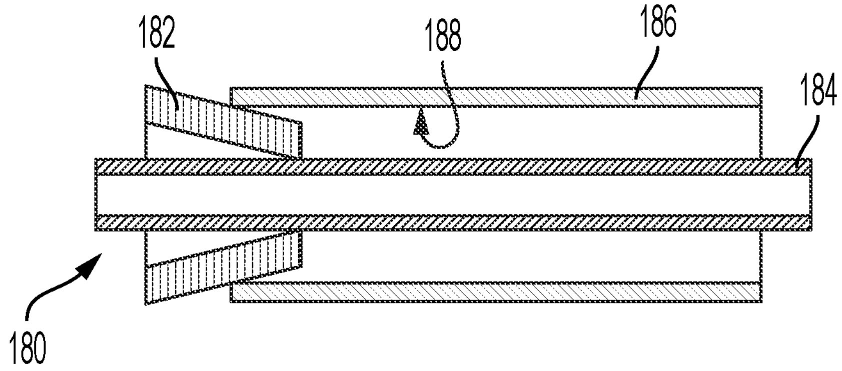
FIG. 4 is a schematic cross section of another illustrative cavitation insert.
Figure 5:
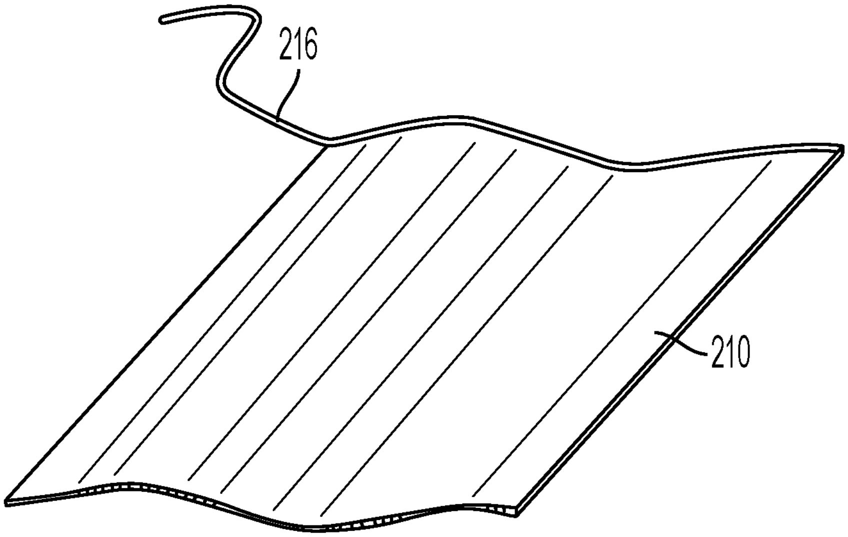
FIG. 5 is an isometric view of an illustrative cavitation shroud.

FIGS. 2-4 are views and cross sections of three illustrative examples of a flexible cavitation apparatus. FIG. 2 is an isometric view of a bag 160 formed of a woven fabric with tubing sewn to an interior 162 and connected to a fluid supply line 164. Parts to be cleaned may be placed inside the bag, proximate the tubing.

FIG. 3 is a cross-sectional view of a cleaning insert 170, including a flexible support 172 and attached tubing 174. In the present example, flexible support 172 is an articulated plastic arm, but may also include elastic cording, wire, or other flexible elongate member. Tubing 174 is bonded to flexible support 172, extending parallel the support and radially surrounding the support. Apertures in tubing 174 may be positioned radially distant from flexible support 172. Cleaning insert 170 is shown positioned in an interior space of a hollow workpiece 176, to clean an internal surface 178 of the workpiece.

FIG. 4 is a cross-sectional view of another cleaning insert 180, including a flexible connector 182 and tubing 184. In the present example, flexible connector 182 is a rubber stopper with a central aperture to receive tubing 184. An outer surface of the connector is tapered to engage an end aperture of a tubular workpiece 186. Flexible connector 182 may thereby position and support tubing 184 in a coaxial position with the tubular workpiece. Apertures of tubing 184 may be positioned radially around the tubing, such as in a spiral pattern or series of rings, to achieve uniform effective cleaning of a cylindrical internal surface 188 of tubular workpiece 186.

Examples, Components, and Alternatives

The following sections describe selected aspects of exemplary flexible cavitation apparatus as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Cavitation Shroud

As shown in FIGS. 5-9, this section describes an illustrative cavitation shroud 210. Shroud 210 is an example of a flexible cavitation apparatus 110, as described above. The shroud includes a fabric carrier 212 and a plurality of parallel tubes 214, which are examples of flexible carrier 112 and tubing 114 respectively, as described above. Each of the plurality of parallel tubes 214 is in fluid communication with a supply line 216. In some examples, fabric carrier 212 may be described as a shroud, and shroud 210 described as a flexible cavitation apparatus including the shroud.

Figure 6:
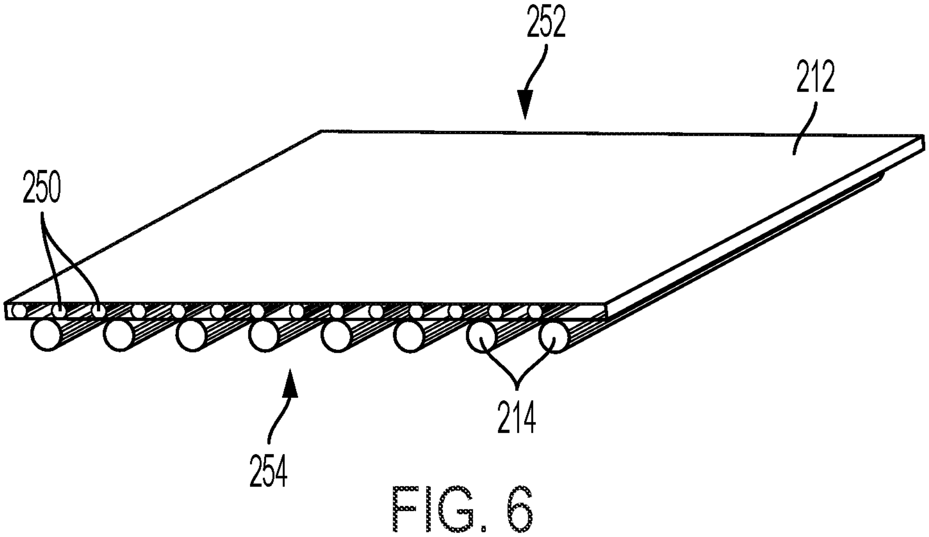
FIG. 6 is a detail view of a portion of the cavitation shroud of FIG. 5.

As shown in FIG. 6, fabric carrier 212 includes a plurality of fibers 250. In the present example, the fabric of the carrier is woven and fibers 250 include weft fibers, which are depicted, and warp fibers, which are not shown. In some examples, fabric carrier 212 may comprise a knitted, felted, and/or other type of fabric. Fabric may be an advantageous material for carrier 212, providing strength and excellent tolerance for repeated flexing and reconfiguration without undue wear, while allowing passage of fluid through the carrier. Such porosity may prevent undesirable accumulation of fluid around a workpiece during cleaning. Fibers 250 may be selected to provide desired properties such as elasticity, temperature tolerance, and/or resistance to cleaning solvents.

In some examples, shroud 210 may include a flexible sheet of another material such as a polymer, plastic, or composite sheet in place of or in addition to the fabric carrier. In some examples, the shroud may include a flexible structure such as another plurality of tubes fixed to or interwoven with plurality of parallel tubes 214. Preferably, such a flexible sheet or structure may be porous to some degree and able to withstand cleaning conditions such as high temperatures and/or exposure to selected chemicals. Materials of shroud 210 may be non-degradable and selected according to an intended cleaning method.

Plurality of parallel tubes 214 are all fixed to one side of fabric carrier 212. Accordingly, shroud 210 may be described as having an outer side 252 and an inner side 254, with tubes 214 on the inner side. In the present example, plurality of parallel tubes 214 are sewn onto fabric carrier 212. In some examples, the tubes may be woven into the fabric of the carrier, may be adhesively bonded to the fabric carrier, and/or may be attached by any method sufficient to fix the tubes in place without adversely affecting flexibility of the fabric carrier.

Shroud 210 may be wrapped around and/or otherwise arranged relative a workpiece such that inner side 254 faces and/or is proximate the workpiece. The shroud may be positioned such that bubbles are generated at approximately half an inch from a surface of the workpiece, or between a quarter of an inch and two inches from the surface. Positioning of the shroud may be determined according to cavitation strength of generated bubbles, material properties of the workpiece, and intended cleaning. For example, the shroud may be positioned further from a soft plastic workpiece to avoid potential damage from cavitation. For another example, the shroud may be closely wrapped around a metal part requiring intensive cavitation action to remove adhered grease or rust.

In the present example, shroud 210 is approximately flat and rectangular. In some examples, the shroud may be constructed with other shapes or curvatures, to more closely conform to a workpiece. The shroud may be held in a fixed position relative to the workpiece throughout a cleaning process, or may be shifted or shaken to increase uniformity of surface exposure to generated cavitation. In an example, shroud 210 may include a vacuum system to more closely conform the shroud to a surface of the workpiece.

Shroud 210 may further include fasteners, catches, and/or supports as appropriate to engage either the workpiece or an independent supporting structure. For example, outer side 252 may include hook and loop fasteners to allow the shroud to be selectively secured in a tubular configuration. For another example, fabric carrier 212 may include a reinforced aperture configured to receive a hook to facilitate suspension of shroud 210.

Figure 7:
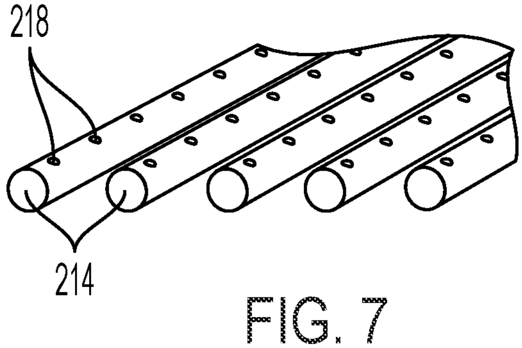
FIG. 7 is a detail view of the tubing of FIG. 6.

FIG. 7 is a view of tubes 214 at inner side 254 of shroud 210, from below the shroud as depicted in FIG. 6. As shown, each of tubes 214 includes a plurality of apertures 218. Each plurality of apertures 218 is disposed on the corresponding tube 214 at a position opposite from fabric carrier 212. That is, the apertures are positioned such that bubbles are released away from the fabric carrier.

In the present example, apertures 218 of each tube 214 are arranged in a line along the tube and regularly spaced along the tube. Tubes 214 of the plurality of parallel tubes are also regularly spaced from one another. Such spacing results in a regular array of apertures 218 over shroud 210, which may produce uniform and consistent cleaning.

Figure 8:
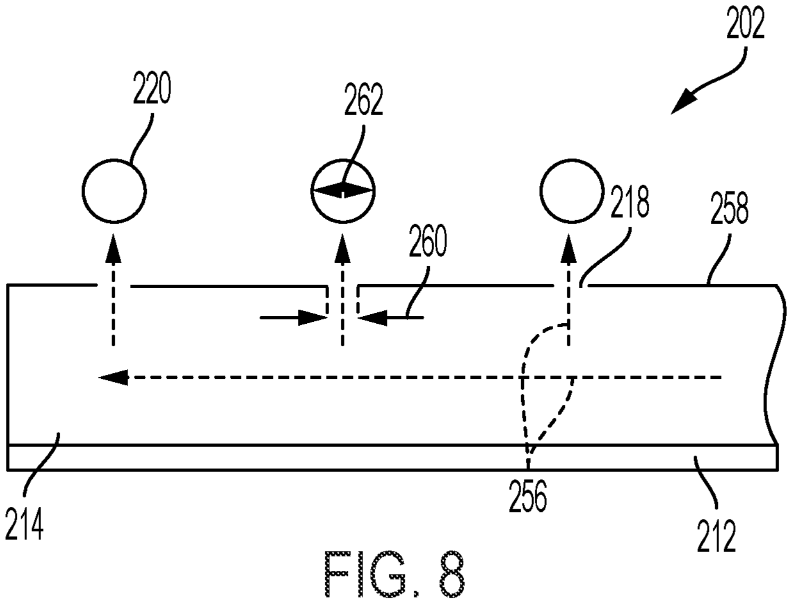
FIG. 8 is a schematic cross-sectional view of one of the tubes of FIG. 7.

FIG. 8 is a schematic diagram of a cross-section of a portion of one tube 214, showing three apertures 218. Passage of a working fluid through the tube and apertures is indicated by arrows 256. Each aperture 218 extends through an outer wall 258 of tube 214, putting an interior of the tube in fluid communication with an external fluid environment 202. The working fluid flows along tube 214 and out of each aperture 218, to generate bubbles 220.

Bubbles 220 may be formed by introduction of the working fluid into fluid environment 202, or decrease in pressure of the working fluid due to a lower and/or atmospheric pressure of the fluid environment. The bubbles may be described as in the fluid environment and/or as in the working fluid. For example, air bubbles in water may be formed when the working fluid is air and the fluid environment is water. For another example, solvent vapour bubbles in water may form when the working fluid is a cleaning solvent dissolved in water under pressure, and the fluid environment is ambient air at atmospheric pressure.

In the present example, tube 214 is formed of a flexible plastic material, such as nylon, PVC, or FEP. In some examples, tube 214 may be rigid and/or include non-plastic materials. For example, the tube may be metal or ceramic. Such tubing may limit which directions shroud 210 is able to flex, but may be suitable for transporting fluids at a high temperature and/or including corrosive substances.

In the present example, apertures 218 are cylindrical and extend through outer wall 258 of tube 214 perpendicular to the wall. The apertures are holes or openings, which may be formed or cut through the tube wall. In some examples, the apertures may have other shapes, and/or may be otherwise formed. For example, an insert may be positioned in outer tube wall 258 to define the aperture.

Each aperture 218 has an opening dimension 260, which in the present example is a diameter of the circular outer opening of the aperture. Opening diameter 260 may be selected according to properties of the working fluid and/or fluid environment to achieve desired properties of bubbles 220. For example, opening diameter 260 may be selected according to a viscosity of the working fluid, to achieve a desired bubble diameter 262.

In the present example, each aperture 218 has the same opening diameter 260 to achieve uniformity in bubbles 220 for consistent cleaning. In some examples, the opening diameter or dimension may vary according to desired bubble properties. In the present example, opening diameter 260 is approximately 3 millimeter (mm). Preferably the opening diameter may be between approximately 0.5 and 4 mm for water or other working fluids with similar fluid dynamic properties.

Figure 9:
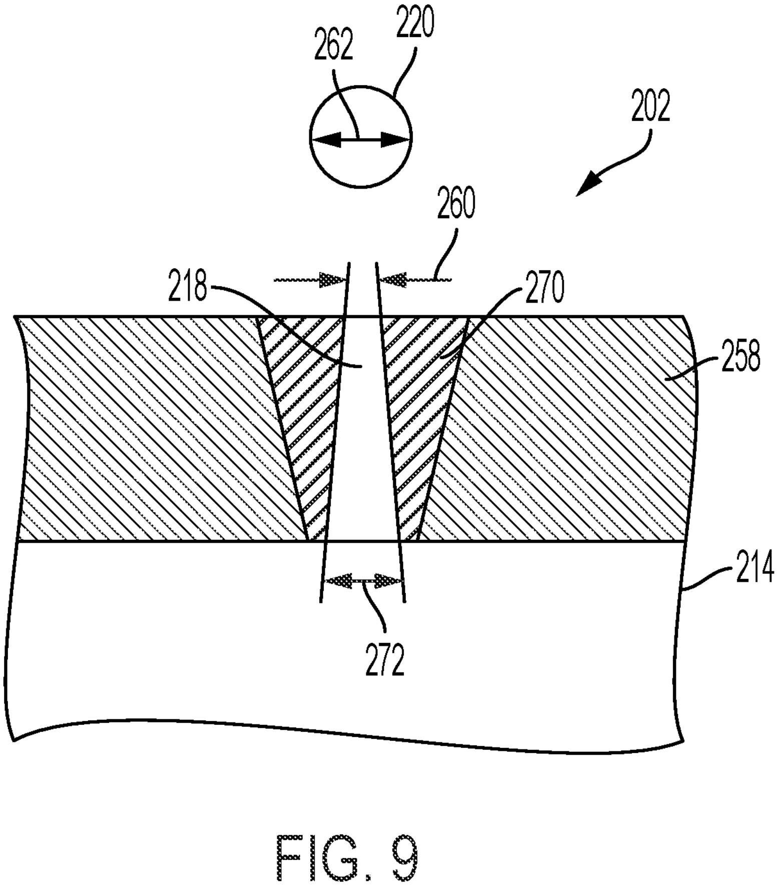
FIG. 9 is a schematic cross-sectional view of a wall of the tube of FIG. 8, with an illustrative nozzle insert.

FIG. 9 depicts an illustrative insert 270, which may be used to define one or more of apertures 218. Insert 270 may be described as a nozzle insert, and may be configured to act as a nozzle on working fluid leaving tube 214. Aperture 218, as defined by insert 270, has a frusticonical shape with a larger inner opening and a smaller outer opening. That is, an inner diameter 272 of aperture 218 proximate the interior of tube 214 is larger than opening diameter 260 of the aperture proximate the fluid environment outside the tube. Inner diameter 272 may also be described as a nozzle entry width, and opening diameter 260 may be described as a nozzle exit width of nozzle insert 270.

Each of diameters 272, 260 and/or a ratio of the diameters may be selected to achieve desired properties of bubbles 220 generated by nozzle insert 270. For example, the ratio may be increased for greater bubble velocity and/or to facilitate cavitation jetting action of the bubbles. For another example, diameter 260 may be increased to generate larger bubbles. In the present example, opening diameter 260 is approximately one half of inner diameter 272.

Nozzle insert 270 also has an outer frusticonical shape, the insert tapering from an outer side of tube wall 258 to an inner side of the tube wall. The outer frusticonical shape of insert 270 may be described as opposing or oriented oppositely to the frusticonal shape of aperture 218. The outer tapered shape of the insert may facilitate insertion into tube wall 258, and the orientation or direction of the taper may allow insertion from the outer side of the tube wall. In the present example, insert 270 comprises a rigid metal material which may deform a cylindrical hole in the flexible plastic of tube wall 258 to accommodate the tapered shape of the insert. The insert is sized to lie approximately flush with the outer and inner sides of the tube wall.

B. Illustrative System for Cavitation Degreasing in a Liquid Environment

Figure 10:
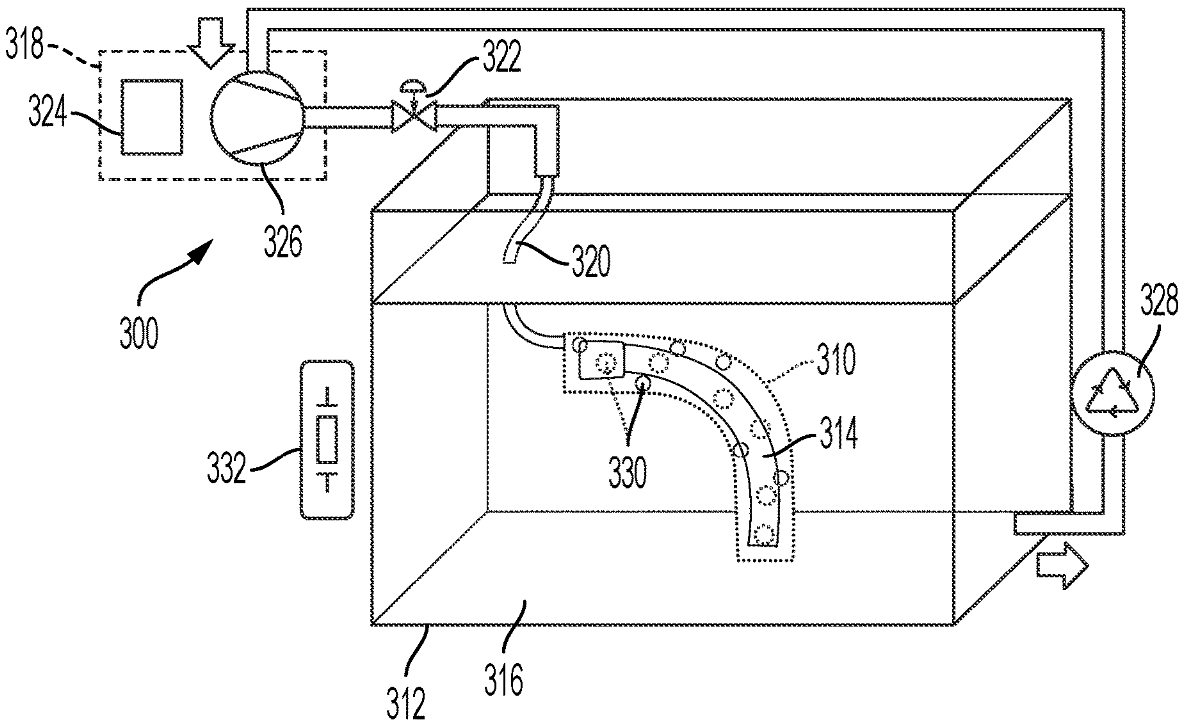
FIG. 10 is a schematic diagram of an illustrative system for cavitation degreasing in a liquid environment.

As shown in FIG. 10, this section describes an illustrative system for cavitation degreasing of a workpiece. Degreasing system 300 is an example of a cleaning system including a flexible cavitation apparatus, as described above.

Degreasing system 300 includes a shroud 310 and a tank 312. Shroud 310 may be shroud 210 as described in Example A, or another such flexible cavitation apparatus. Tank 312 is configured to create a liquid environment for degreasing of a workpiece 314. In the present example, workpiece 314 is a curved section of pipe and tank 312 is filled with a liquid cleaning solvent 316.

Shroud 310 is applied to workpiece 314, and both the shroud and the workpiece are submerged in liquid solvent 316, in tank 312. Shroud 310 is connected to a fluid supply assembly 318 by a flexible supply line 320 and a pneumatic valve 322. Fluid supply assembly 318 incudes a reservoir 324 and a pump 326, and is configured to deliver a working vapour to shroud 310. In some examples, as described further in example C below, the supply assembly 318 may include a compressor configured to pulse pressure of the working vapour.

To remove grease from workpiece 314, vapour is transported by pump 326 from reservoir 324 through pneumatic valve 322 and flexible supply line 320 to shroud 310. The vapour is released from apertures in tubing of the shroud to produce bubbles 330 of vapour in solvent liquid 316 surrounding workpiece 314. To induce cavitation of bubbles 330, pressure pulses are induced in solvent liquid 316 by an ultrasonic transducer 332.

In FIG. 10, transducer 332 is positioned at one side of tank 312. In general, the transducer may be positioned at any point, exterior or interior to the tank, appropriate to produce pressure waves that interact with bubbles 330 in shroud 310. In the present example, transducer 332 is a contact piezoelectric ultrasonic transducer 332. In some examples, the transducer may be an immersion transducer, a capacitive transducer, and/or any device appropriate to generate pressure pulses in solvent liquid 316.

In the present example, degreasing system 300 is a closed system with a recycler 328, and the working vapour supplied by assembly 318 is a gaseous form of liquid cleaning solvent 316. Subsequent to the cavitation of bubbles 330, the working vapour may condense and mix with liquid solvent 316. Recycler 328 may be configured to filter out or otherwise remove dirt or grease in liquid solvent 316 resulting from cleaning of workpiece 314, and evaporate the solvent to refill reservoir 324.

In some examples, different materials may be used to fill tank 312 and as a working vapour. For instance, the tank may be filled with liquid water and the working vapour may be a solvent. Use of a single material may facilitate recycling, but separate systems may be used to clean and return the liquid filling tank 312 and/or condense or recapture and reuse the working vapour.

C. Illustrative System for Cavitation Degreasing in a Vapour Environment

Figure 11:
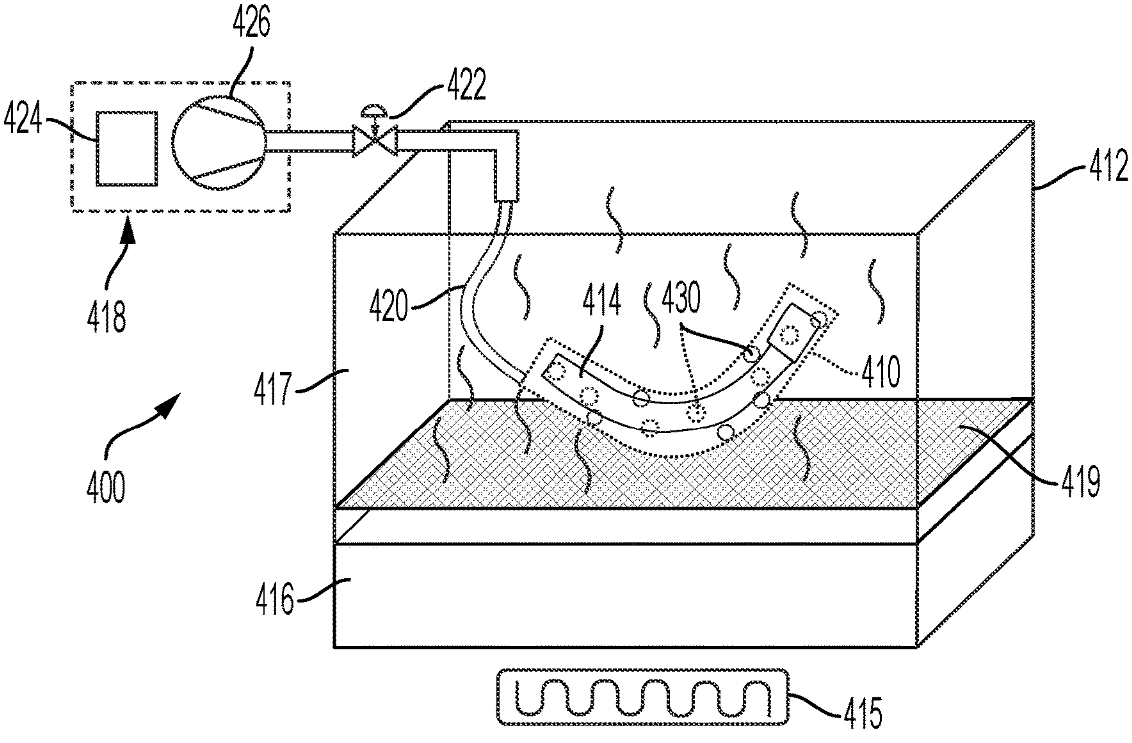
FIG. 11 is a schematic diagram of an illustrative system for cavitation degreasing in a vapour environment.

As shown in FIG. 11, this section describes an illustrative system for cavitation degreasing of a workpiece. Degreasing system 400 is an example of a cleaning system including a flexible cavitation apparatus, as described above.

Degreasing system 400 includes a shroud 410 and a tank 412. Shroud 410 may be shroud 210 as described in Example A, or another such flexible cavitation apparatus. Tank 412 is configured to create a vapour environment for degreasing of a workpiece 414, by evaporation of a liquid. In the present example, a heater 415 is positioned below tank 412 to evaporate the liquid, and thereby fill the remainder of the tank with a solvent vapour 417. A mesh 419 separates the liquid and the vapour.

In some examples, tank 412, heater 415 and mesh 419 may be part of a boil sump or vapour degreaser. In some examples, existing boil sump or vapour degreaser apparatus may be converted for use in degreasing system 400. For instance, shroud 410 may be installed in place of a spray wand or other liquid delivery accessory.

As shown in FIG. 11, shroud 410 is applied to workpiece 414, and both the shroud and the workpiece are suspended in solvent vapour 417. The shroud and workpiece may be suspended in a basket or other porous container, the shroud may include connection features to engage a suspension structure, and/or the shroud and workpiece may be suspended in any effective manner. In some examples, the shroud and workpiece may be supported from below by mesh 419.

Shroud 410 is connected to a fluid supply assembly 418 by a flexible supply line 420 and a pneumatic valve 422. Fluid supply assembly 418 incudes a reservoir 424 and a compressor 426, and is configured to deliver a working fluid to shroud 410. The working fluid is a mixture of solvent liquid and air. Air may be dissolved in the liquid under pressure, may form bubbles in the liquid, and/or the working fluid may exhibit multi-phase flow.

To remove grease from workpiece 414, the working fluid mixture is transported by compressor 426 from reservoir 424 through pneumatic valve 422 and flexible supply line 420 to shroud 410. The working fluid mixture is released from apertures in tubing of the shroud to produce bubbles 430 of air in solvent liquid surrounding workpiece 414. To induce cavitation of bubbles 430, pressure pulses are induced in the supplied working fluid mixture by compressor 426.

Minimum and maximum pressure in the working fluid, pulse frequency, and/or pulse pattern may be selected to facilitate cavitation of bubbles 430. For example, appropriate pressure may selected according to working fluid compressibility and/or pulse frequency may be selected according a size of bubbles 430. In the present example, pressure cycles between approximately 10 and 100 pounds per square inch (psi) in a square waveform at 30 cycles per minute, or between approximately 10 and 50 cycles per minute.

In the present example, degreasing system 400 is not configured to recycle solvent liquid 416. Instead, liquid evaporated from tank 412 is replaced by liquid from fluid supply assembly 418, introduced in the working fluid mixture of shroud 410. In some examples, the degreasing system may include a recycling system similar to recycler 328 described in Example B. For example, refrigeration coils may be positioned around a top portion of tank 312 to condense escaping solvent vapour 417, and solvent liquid 416 may be filtered and transported to fluid supply assembly 418 to form the working fluid mixture.

In the depicted example, shroud 410 is a flexible sleeve which conforms closely to the shape of workpiece 414. In some examples, the shroud may not be a closed sleeve, and/or may not closely match the geometry of the workpiece. For instance, the shroud may be a bag or mat-like structure loosely wrapped around the workpiece.

D. Illustrative Method of Cavitation Degreasing

Figure 12:
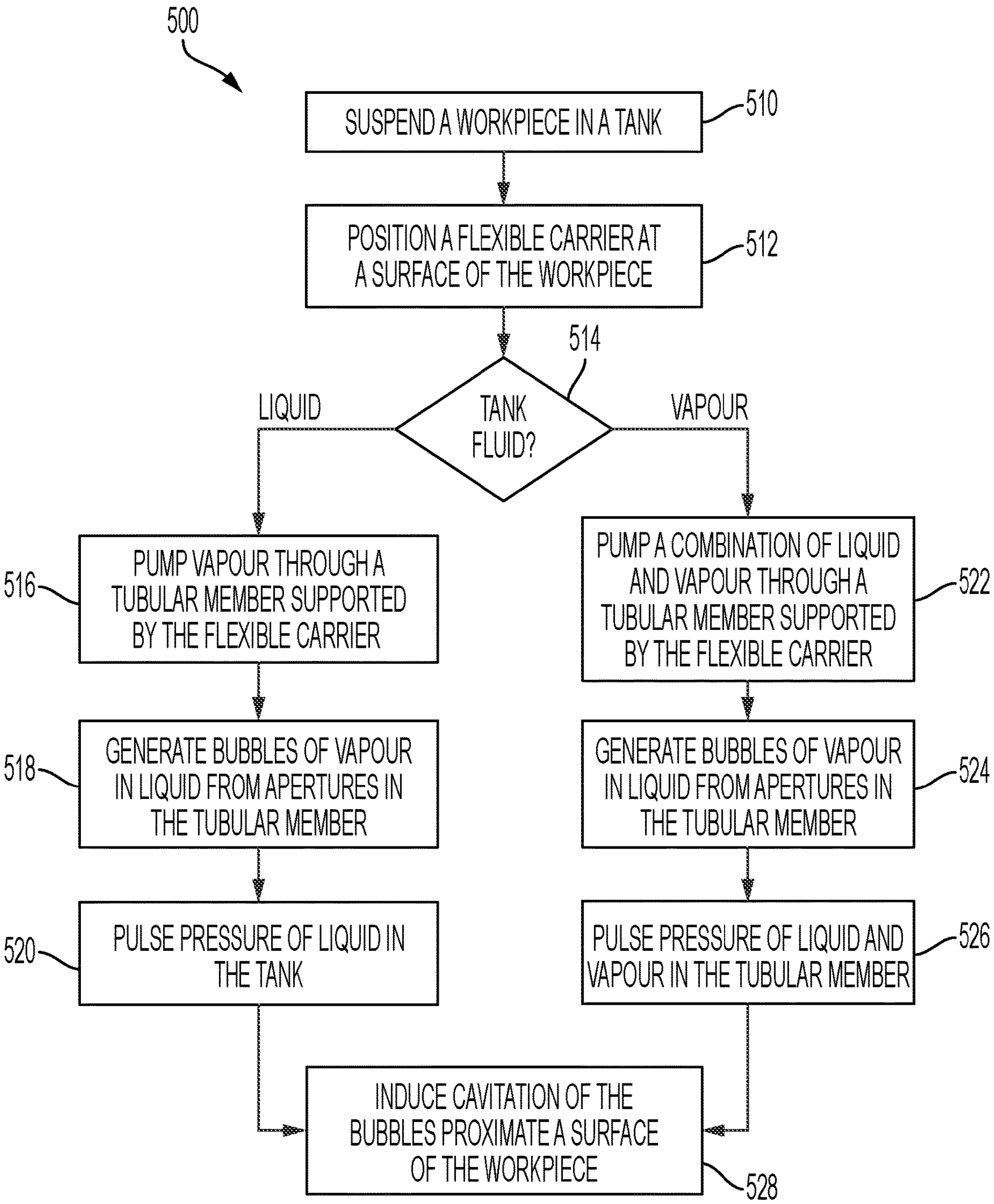
FIG. 12 is a flow chart depicting steps of an illustrative method for cavitation degreasing, according to the present teachings.

This section describes steps of an illustrative method 500 for degreasing a workpiece; see FIG. 12. Aspects of flexible cavitation apparatus, shrouds, and/or degreasing systems described above may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 500 are described below and depicted in FIG. 12, the steps need not necessarily all be performed, and in some cases may be performed simultaneously or in a different order than the order shown.

At step 510, the method includes suspending a workpiece in a tank. The workpiece may be any part or material for which degreasing is required. Examples of workpieces include, but are not limited to pipes, fasteners, plates, vessels, gears, shafts and valves. The workpiece may comprise any material of sufficient strength to withstand cavitation action without sustaining damage. Properties and parameters such as cavitation intensity and duration of cleaning performed may be selected according to geometry, material, and/or grease or dirt levels of the workpiece.

Step 512 includes positioning a flexible carrier at a surface of the workpiece. The surface may be internal or external to the workpiece and flat, curved, or complex. Positioning the flexible carrier may include conforming the flexible carrier to the surface, inserting the flexible carrier into an interior of the workpiece, placing the workpiece in an interior space defined by the flexible carrier, suspending the flexible carrier proximate the surface, and/or any effective method of positioning.

Method 500 proceeds with either steps 516-520 or steps 522-526, according to decision 514. If the tank in which the workpiece is suspended is filled with a liquid, then steps 516-520 are performed. If the tank is filled with a vapour, then steps 522-526 are performed.

Step 516 includes pumping a vapour through a tubular member supported by the flexible carrier. The tubular member may be disposed on a side or portion of the flexible carrier facing the surface of the workpiece. The vapour may be pumped through a single tubular member extending over or along the flexible carrier, or may be pumped through a plurality of tubular members disposed on the flexible carrier. For example, a single flexible tube may be coiled to cover one side of a sheet of fabric, or a plurality of separate tubes may be positioned radially surrounding a wire. The vapour may be pumped from a single source through the one or more tubular members.

The tubular member or members may be connected or fixed to the flexible carrier in any effective manner, including but not limited to bonding, sewing, weaving, and/or manufacture as a single unitary structure. Preferably the tubular member may be formed of a flexible plastic material, but in some examples may include rigid and/or include non-plastic materials. Both the tubular member and the flexible carrier may be non-degradable and configured to withstand repeated, extended exposure to both the liquid filling the tank and the vapour pumped through the tubular member.

At step 518, the method includes generating bubbles of vapour in liquid from apertures in the tubular member. The bubbles may form as the vapour pumped through the tubular member escapes the tubular member through the apertures into the liquid filling the tank. The bubbles may be formed close to the surface of the workpiece. For example, the bubbles may form approximately half an inch from the surface, or between a quarter of an inch and 3 inches from the surface. The flexible carrier supporting the tubular member may be positioned in step 512, such that bubbles are formed at a desired distance from the surface.

The apertures in the tubular member may be configured to facilitate desired bubble formation. For example, an aperture size conducive to formation of a desired bubble size may be selected. For another example, the apertures may be nozzle or cone-shaped to increase bubble velocity and/or increase bubble production. In step 516, the vapour may be pumped at a flow rate or under a pressure selected to produced desired bubbles.

Step 520 includes pulsing pressure of liquid in the tank. For example, an ultrasonic transducer positioned in contact with the exterior of the tank, or immersed in the liquid filling the tank may be used to generate pressure pulses. Unlike in ultrasonic cavitation methods, the liquid in the tank need not undergo a rarefaction phase where the pressure drops below the saturation vapor pressure of the liquid. Instead, the transducer may produce pulses of high pressure sufficient to induce collapse of the bubbles formed in step 518. Frequency, duration, and intensity of the pulses may be selected according to properties of the system such as liquid viscosity, temperature, and/or bubble surface tension. For example, in an aqueous solution pulses may peak at approximately 100 psi and cycle between 10 and 50 times per minute.

At step 522, for a tank filled with vapour, the method includes pumping a combination of liquid and vapor through a tubular member supported by the flexible carrier. The vapor may be dissolved in the liquid under pressure, may form bubbles in the liquid, and/or the combination may exhibit multi-phase flow.

Similarly to step 516, the tubular member may be disposed on a side or portion of the flexible carrier facing the surface of the workpiece. The liquid and vapour combination may be pumped through a single tubular member extending over or along the flexible carrier, or may be pumped through a plurality of tubular members disposed on the flexible carrier. As described above, the tubular member or members may be connected or fixed to the flexible carrier in any effective manner, and the tubular member and the flexible carrier may include any non-degradable material or materials configured to withstand repeated, extended exposure to both the liquid filling the tank and the vapour and liquid combination pumped through the tubular member.

Step 524 includes generating bubbles of vapour in liquid from apertures in the tubular member. For a liquid and vapor combination in which the vapor is dissolved in the liquid under pressure, the bubbles may be formed by escape of the pumped combination into the lower pressure vapor environment of the tank. For a combination already including bubbles, the apertures may direct and/or resize the bubbles as the combination escapes. For a mixture of vapor and liquid flow, passage through the apertures may induce bubble formation.

At step 526, the method includes pulsing pressure of liquid and vapour in the tubular member. That is, pressure of the combination of liquid and vapour pumped through the tubular member may be pulsed. A compressor may be used in combination with and/or in place of the pump to generate the pressure pulses. Similarly to step 520, frequency, duration, and intensity of the pulses may be selected according to properties of the system such as liquid viscosity, temperature, and/or bubble surface tension. For example, in an aqueous solution pulses may cycle between approximately 10 and 100 psi, at between 10 and 50 cycles per minute.

Step 528 of method 500, both for tanks filled with liquid or filled with vapor, includes inducing cavitation of the generated bubbles proximate a surface of the workpiece. Cavitation of the bubbles may be induced by action of the pressure pulses on the bubbles. Action of the induced cavitation on the workpiece may mechanically degrease the exposed surface.

Cavitation of step 528 may be calibrated to effectively clean the workpiece without causing damage to the cleaned surface. For example, bubble size, pressure pulse frequency, tank liquid viscosity, and/or other parameters may be selected or adjusted to achieve a cavitation intensity selected according to a material of the workpiece. For another example, step 528 may be performed and the surface exposed to cavitation for a limited period of time.

In some examples, method 500 may be used for purely mechanical degreasing or cleaning of a part, and fluids such as water and air may be used to perform cavitation. In some examples, mechanical cleaning by cavitation may be augmented with cleaning agents such as solvents or detergents. Cleaning agents may be incorporated into the fluid filling the tank and/or the fluid pumped through the tubular member.

In some examples, method 500 may include repositioning or shaking of the flexible carrier during cleaning or between cleaning sessions, to achieve uniform degreasing and avoid dead spots not exposed to sufficient cavitation. The method may also include other cleaning processes prior to, subsequent to, or between sessions of cavitation. For example, the workpiece may be dipped or rinsed in a solvent once cavitation degreasing is completed.

Illustrative Combinations and Additional Examples

This section describes additional aspects and features of flexible cavitation apparatus and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An apparatus for removing adhered material from an object surface, comprising:

a fluid source, a flexible carrier configured to conform to the object surface, and a tubular member connected to the flexible carrier and configured to carry fluid from the fluid source to the flexible carrier, the tubular member having an aperture configured to release fluid from the tubular member and generate cavitation bubbles proximate the object surface.

A1. The apparatus of A0, wherein the carrier comprises a shroud configured to be wrapped around the object surface.

A2. The apparatus of A1, wherein the shroud is comprised of a woven fabric.

A3. The apparatus of A1 or A2, wherein the shroud is comprised of a polymeric material.

A4. The apparatus of any of A1-A3, wherein the shroud is bendable to correspond to a shape of the object surface.

A5. The apparatus of any of A1-A4, wherein the shroud and tubular member are configured for use in an ambient air environment.

A6. The apparatus of any of A0-A5, wherein the carrier comprises a bag configured to contain the object.

A7. The apparatus of any of A0-A6, wherein the object surface is an interior surface, and the carrier comprises a flexible elongate member configured to be inserted into the object.

A8. The apparatus of any of A0-A7, further comprising:

a nozzle installed in the aperture of the tubular member.

A9. The apparatus of any of A0-A8, wherein the tubular member is one of multiple tubular members connected to the flexible carrier, each tubular member having an aperture configured to generate cavitation bubbles proximate the surface of the object.

A10. The apparatus of A9, wherein the multiple tubular members are arranged in parallel.

A11. The apparatus of A9 or A10, wherein the multiple tubular members are arranged to form a mat-like structure.

A12. The apparatus of any of A9-A11, wherein each tubular member has multiple apertures configured to generate cavitation bubbles proximate the surface of the object.

A13. The apparatus of any of A0-A12, wherein the tubular member is configured to carry an aqueous fluid or a solvent fluid.

A14. The apparatus of any of A0-A13, wherein the tubular member is configured to carry a multiphase mixture including a liquid, a vapor, and a cleaning agent.

A15. The apparatus of any of A0-A14, wherein the tubular member is configured to carry fluid in a liquid phase, a gas phase, or a combination thereof.

A16. The apparatus of any of A0-A15, further comprising:

a tank containing fluid, wherein the flexible carrier and tubular member are immersible in the fluid contained in the tank.

A17. The apparatus of A16, further comprising:

a fluid recycling device connecting the tank to the fluid source, configured to recycle fluid from the tank through the fluid source, to the tubular member, through the aperture, and back to the tank.

A18. The apparatus of any of A0-A17, wherein the fluid source includes a pump configured to pump fluid, by pulsed pressure, through the tubular member.

A19. The apparatus of any of A0-A18, wherein the fluid source, the flexible carrier, and the tubular member are configured for portable use.

A20. The apparatus of any of A0-A19, wherein the flexible carrier is a stopper with a central hole, the tubular member extending through the hole of the stopper.

A21. The apparatus of any of A0-20, wherein the aperture is between approximately 0.5 and 3 millimeters in diameter.

A21. The apparatus of any of A0-19, wherein the generated cavitation bubbles remove grease adsorbed to the object surface.

B0. A method of removing adhered material from an object surface, comprising:

positioning a flexible carrier at the object surface, wherein the flexible carrier supports one or more tubular members, each tubular member having one or more apertures configured to deliver fluid including cavitation bubbles to the object surface, pumping fluid through the one or more tubular members, and through the one or more apertures, to generate cavitation bubbles proximate to the object surface.

B1. The method of B0, wherein the positioning step incudes wrapping the flexible carrier at least partially around the object surface.

B2. The method of B0 or B1, wherein the pumping step includes oscillating pressure in the one or more tubular members.

B3. The method of any of B0-B2, further comprising generating pressure oscillations in a fluid environment surrounding the flexible carrier.

B4. The method of B3, wherein generating pressure oscillations includes applying ultrasound to the fluid environment.

B4. The method of any of B2-B4, wherein the pressure oscillates between approximately 10 and 100 pounds per square inch.

B5. The method of any of B2-B5, wherein the pressure oscillates at a rate between approximately 10 and 50 cycles per minute.

B6. The method of any of B0-B6, wherein the object surface is submerged in a liquid, and the fluid pumped through the one or more tubular members is a vapor.

B7. The method of B6, further including heating the liquid in which the object surface is submerged.

B7. The method of any of B0-B5, wherein the object surface is suspended in a vapor, and the fluid pumped through the one or more tubular members includes a mixture of a liquid and a vapor.

C0. An apparatus for removing material from an object surface, comprising:

a fluid source, a flexible carrier configured to wrap at least partially around the object surface, and a tubular member configured to carry fluid from the fluid source to the flexible carrier, wherein the tubular member has a plurality of apertures configured to generate a bubble cloud proximate the surface of the object.

C1. The apparatus of C0, wherein each aperture is configure to generate a plurality of cavitation bubbles.

C2. The apparatus of C0 or C1, wherein each aperture generates a plurality of bubbles configured to collapse on or near the surface of the object.

C3. The apparatus of any of C0-C2, further comprising:

a plurality of nozzles installed in the apertures, each nozzle being configured to generate cavitation bubbles proximate to the object surface.

C4. The apparatus of C3, wherein each nozzle is configured to generate bubbles of approximately a selected size.

C5. The apparatus of C3 or C4, wherein each nozzle is conical and includes a conical aperture.

C6. The apparatus of any of C3-C4, wherein each nozzle comprises a metallic material.

C7. The apparatus of any C3-C5, wherein each nozzle is adhesively bonded to the tubular member.

D0. An apparatus for mechanical cleaning of a surface, comprising:

a flexible tube having an interior volume defined by an outer wall, a working fluid transported through the flexible tube, a plurality of apertures extending through the outer wall from the interior volume to an exterior environment, a plurality of nozzle insert structures, each nozzle insert structure being disposed in a corresponding aperture of the plurality of apertures, wherein each nozzle of the plurality of nozzles releases bubbles from the interior volume of the flexible tube, and the bubbles undergo cavitating collapse in response to a variation in pressure of the working fluid or the exterior environment.

Advantages, Features, and Benefits

The different examples of the cavitation cleaning systems and methods described herein provide several advantages over known solutions for mechanical cleaning. For example, illustrative examples described herein allow effective cleaning of parts with complex geometries and/or interior surfaces.

Additionally, and among other benefits, illustrative examples described herein allow production of cavitation bubbles close to a surface, avoiding wasted cavitation energy.

Additionally, and among other benefits, illustrative examples described herein allow cleaning solely by mechanical action of cavitation or cavitation cleaning assisted by use of a solvent liquid and/or vapour.

Additionally, and among other benefits, illustrative examples described herein allow recycling of working fluids.

No known system or device can perform these functions, particularly using a single cleaning apparatus for a variety of complex part geometries. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An apparatus for removing adhered material from a surface of an object, comprising:
- a fluid source,
- a flexible carrier,
- a supply line connected to the flexible carrier and configured to carry a fluid from the fluid source to the flexible carrier,
- a tubular member having a plurality of apertures, in fluid communication with the supply line, fixed to the flexible carrier, and configured to generate cavitation bubbles proximate the surface of the object by releasing the fluid from an interior of the tubular member through the apertures to an external fluid environment of the tubular member, the object being disposed in the external fluid environment, and
- a tank containing fluid, wherein the flexible carrier and tubular member are immersible in the fluid contained in the tank.

2. The apparatus of claim 1, wherein the carrier is a shroud configured to be wrapped around the object.

3. The apparatus of claim 2, wherein the shroud is comprised of a woven fabric.

4. The apparatus of claim 1, wherein the carrier is a bag configured to contain the object.

5. The apparatus of claim 1, wherein the surface of the object is an interior surface, and the carrier is a flexible elongate member configured to be inserted into the object.

6. The apparatus of claim 1, further comprising:
- a nozzle installed in each of the plurality of apertures of the tubular member.

7. The apparatus of claim 1, wherein the tubular member is one of multiple tubular members connected to the flexible carrier, each tubular member having a plurality of apertures configured to generate cavitation bubbles proximate the surface of the object by releasing the fluid from the respective tubular member through the apertures.

8. The apparatus of claim 7, wherein the multiple tubular members are arranged in parallel.

9. The apparatus of claim 1, wherein the tubular member is configured to carry fluid in a liquid phase, a gas phase, or a combination thereof.

10. The apparatus of claim 1, further comprising:
- a fluid recycling device connecting the tank to the fluid source, configured to recycle fluid from the tank through the fluid source, to the tubular member, through the aperture, and back to the tank.

11. The apparatus of claim 1, wherein the fluid source includes a pump configured to pump fluid, by pulsed pressure, through the tubular member.

12. A method of removing adhered material from a surface of an object, comprising:
- positioning a flexible carrier at the surface of the object, wherein the flexible carrier supports one or more tubular members, each tubular member having a plurality of apertures, being fixed to the flexible carrier, and being in fluid communication with a supply line connected to the flexible carrier,
- immersing the flexible carrier and the one or more tubular members in a first fluid contained in a tank,
- pumping a second fluid from a fluid source through the supply line to the one or more tubular members,
- generating a cavitation bubble cloud proximate to the surface of the object by releasing the second fluid from an interior of the tubular member through the apertures to an external fluid environment of the tubular member, the object being disposed in the external fluid environment.

13. The method of claim 12, wherein the positioning step incudes wrapping the flexible carrier at least partially around the surface of the object.

14. The method of claim 12, wherein the pumping step includes oscillating pressure in the one or more tubular members.

15. An apparatus for removing material from a surface of an object, comprising:
- a fluid source,
- an approximately flat flexible carrier having an inner side and configured to wrap at least partially around the object with the inner side facing the surface of the object, and
- multiple tubular members fixed to the inner side of the flexible carrier, the tubular members being arranged parallel to one another in a line across the inner side of the carrier,
- wherein each tubular member is configured to carry a fluid from the fluid source, and has a plurality of apertures configured to generate a bubble cloud proximate the surface of the object by releasing the fluid from the tubular member through the apertures.

16. The apparatus of claim 1, wherein each aperture is defined by a nozzle insert disposed in a wall of the tubular member.

17. The apparatus of claim 16, wherein each nozzle insert is sized to lie approximately flush with an outer side and an inner side of the wall of the tubular member.

18. The apparatus of claim 1, wherein the flexible carrier and the tubular member are comprised of different materials.

19. The apparatus of claim 15, wherein the plurality of apertures of each tubular member is disposed on the tubular member such that the fluid released through the apertures is released away from the flexible carrier.

20. An apparatus for removing adhered material from a surface of an object, comprising:
- a fluid source,
- a flexible carrier comprised of a woven fabric,
- a supply line connected to the flexible carrier and configured to carry a fluid from the fluid source to the flexible carrier, and
- a tubular member having a plurality of apertures, in fluid communication with the supply line, fixed to the flexible carrier, and configured to generate cavitation bubbles proximate the surface of the object by releasing the fluid from an interior of the tubular member through the apertures to an external fluid environment of the tubular member, the object being disposed in the external fluid environment.

* * * * *